US011346429B2

United States Patent
Mordukhovich et al.

(10) Patent No.: US 11,346,429 B2
(45) Date of Patent: *May 31, 2022

(54) TWO-SPEED TRANSMISSION FOR ELECTRIC VEHICLE INCLUDING A PAIR OF MECHANICAL DIODES THAT ARE INDIVIDUALLY ENGAGED TO PROVIDE TWO GEAR RATIOS

(71) Applicant: AVL Powertrain Engineering, Inc., Plymouth, MI (US)

(72) Inventors: Gregory Mordukhovich, Bloomfield Hills, MI (US); Hamid Vahabzadeh, Oakland, MI (US)

(73) Assignee: AVL POWERTRAIN ENGINEERING, INC., Plymouth, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/208,855

(22) Filed: Mar. 22, 2021

(65) Prior Publication Data

US 2021/0207686 A1 Jul. 8, 2021

Related U.S. Application Data

(63) Continuation of application No. 16/926,889, filed on Jul. 13, 2020, now Pat. No. 10,955,030, which is a continuation of application No. 16/216,272, filed on Dec. 11, 2018, now Pat. No. 10,711,866, which is a continuation of application No. 15/486,765, filed on Apr. 13, 2017, now Pat. No. 10,208,837, which is a
(Continued)

(51) Int. Cl.
*F16H 3/46* (2006.01)
*B60K 17/08* (2006.01)
*F16H 3/44* (2006.01)

(52) U.S. Cl.
CPC .............. *F16H 3/46* (2013.01); *B60K 17/08* (2013.01); *F16H 2003/445* (2013.01);
(Continued)

(58) Field of Classification Search
CPC ..... B60K 17/08; F16H 3/62; F16H 2003/445; F16H 2200/0021; F16H 2200/0034;
(Continued)

(56) References Cited

U.S. PATENT DOCUMENTS 5,079,965 A 1/1992 Leber et al.
5,507,195 A 4/1996 Trick
(Continued)

OTHER PUBLICATIONS

Johanson, Chris. Automatic Transmissions and Transaxles. 4th ed. 2015. Chaper 1, Introduction to Automatic Transmissions and Transaxles, pp. 11-34, TheGoodheart-Willcox Co., Inc., United States.

*Primary Examiner* — Huan Le
(74) *Attorney, Agent, or Firm* — Honigman LLP; Matthew H. Szalach

(57) ABSTRACT

A two-speed transmission for an electric vehicle includes a planetary gear set selectively coupling an input shaft and an output shaft. The planetary gear set is configured to provide two forward gear ratios and neutral. The planetary gear set includes at least one sun gear, at least one pinion in meshing engagement with the at least one sun gear, at least one ring gear meshingly engaged with the at least one pinion, and a carrier. The carrier supports the at least one pinion and is connected to the output shaft such that rotation of the carrier drives the output shaft. The two-speed transmission also includes one or more elements that rotatably couple the at least sun gear, the at least one pinion, the at least one ring gear, the input shaft, and the carrier with one another and/or a ground. Examples of such elements include clutches, brakes, and mechanical diodes.

20 Claims, 9 Drawing Sheets

Related U.S. Application Data continuation of application No. 14/560,697, filed on Dec. 4, 2014, now abandoned.

(60) Provisional application No. 61/912,163, filed on Dec. 5, 2013.

(52) U.S. Cl.
CPC ........... *F16H 2200/0021* (2013.01); *F16H 2200/0034* (2013.01); *F16H 2200/2007* (2013.01); *F16H 2200/2035* (2013.01); *F16H 2200/2064* (2013.01); *F16H 2200/2066* (2013.01); *F16H 2200/2069* (2013.01); *F16H 2200/2082* (2013.01); *F16H 2200/2084* (2013.01); *F16H 2200/2094* (2013.01)

(58) Field of Classification Search
CPC ..... F16H 2200/2007; F16H 2200/2035; F16H 2200/2064; F16H 2200/2082; F16H 2200/2094
See application file for complete search history.

(56) References Cited

U.S. PATENT DOCUMENTS

| | | |
|---|---|---|
| 5,609,062 A | 3/1997 | Reynolds |
| 5,743,142 A | 4/1998 | Leber et al. |
| 5,761,961 A | 6/1998 | Krauss et al. |
| 5,823,051 A | 10/1998 | Hall, III |
| 6,244,123 B1 | 6/2001 | Hegerath et al. |
| 7,070,530 B2 | 7/2006 | Ai et al. |
| 9,080,650 B2 * | 7/2015 | Kienzle ............... F16H 3/663 |
| 9,933,049 B2 * | 4/2018 | Kimes ............... F16H 3/728 |
| 10,208,837 B2 | 2/2019 | Mordukhovich et al. |
| 10,711,866 B2 | 7/2020 | Mordukhovich et al. |
| 10,955,030 B2 * | 3/2021 | Mordukhovich ......... F16H 3/46 |
| 2003/0109970 A1 | 6/2003 | Nakamori |
| 2003/0216211 A1 | 11/2003 | Miyazaki |
| 2007/0129203 A1 | 6/2007 | Raghavan et al. |
| 2007/0298923 A1 | 12/2007 | Raghavan |
| 2008/0261766 A1 | 10/2008 | Koyama et al. |
| 2011/0079097 A1 | 4/2011 | Cavallino |
| 2011/0212807 A1 | 9/2011 | Kraynev |
| 2011/0218070 A1 | 9/2011 | Mack et al. |
| 2011/0287884 A1 | 11/2011 | Unno et al. |
| 2013/0005526 A1 | 1/2013 | Matsubara et al. |
| 2013/0036848 A1 | 2/2013 | Becke et al. |
| 2013/0095970 A1 | 4/2013 | Conlon et al. |
| 2013/0267378 A1 | 10/2013 | Hiraiwa |
| 2014/0298790 A1 | 10/2014 | Oita |
| 2015/0158382 A1 | 6/2015 | Mordukhovich et al. |
| 2015/0330492 A1 | 11/2015 | Lee et al. |
| 2016/0272059 A1 | 9/2016 | Watanabe et al. |
| 2017/0219064 A1 | 8/2017 | Mordukhovich et al. |

* cited by examiner

TWO-SPEED TRANSMISSION FOR ELECTRIC VEHICLE INCLUDING A PAIR OF MECHANICAL DIODES THAT ARE INDIVIDUALLY ENGAGED TO PROVIDE TWO GEAR RATIOS

CROSS-REFERENCE TO RELATED APPLICATIONS

This application is a continuation of U.S. patent application Ser. No. 16/926,889, filed on Jul. 13, 2020, which is a continuation of U.S. patent application Ser. No. 16/216,272, filed on Dec. 11, 2018, which is a continuation of U.S. patent application Ser. No. 15/486,765, filed on Apr. 13, 2017, which is a continuation of U.S. patent application Ser. No. 14/560,697 filed on Dec. 4, 2014, all of which claim the benefit of U.S. Provisional Application No. 61/912,163, filed on Dec. 5, 2013. The entire disclosure of each of the above applications is incorporated herein by reference.

FIELD

The present disclosure relates to a two-speed transmission for a vehicle, and more particularly, to a two-speed transmission for an electric vehicle.

BACKGROUND

Electric vehicles are typically driven by electric motors that rely on batteries for electrical power. Electricity may be supplied to the batteries for storage from a variety of different sources. For example, electricity may be supplied to the batteries of an electric vehicle by a charger that is plugged into an electrical transmission network (i.e. an electrical power grid), by electricity generated by an internal combustion engine, by electricity produced by regenerative vehicle braking, and/or by solar panels mounted on the electric vehicle.

Existing electric vehicles typically utilize a fixed ratio, single-speed transmission that provides one forward gear. Such electric vehicles are fitted with relatively large electric motors such that there is sufficient torque to launch the vehicle from a standing stop and enough power to drive the vehicle to highway speeds. These large electric motors require a large amount of electricity to properly operate. Accordingly, large arrays of batteries are generally required for extended operation of a conventional electric vehicle. The foremost limitation of electric vehicles is the cost and size of the batteries. Batteries are both heavy and expensive, thereby setting practical limits to the range of electrical vehicles. What is needed is a way to make electric vehicles more efficient such that the range can be increased without the need for additional batteries and their associated weight and cost trade-offs.

SUMMARY

The subject disclosure provides a two-speed transmission for a vehicle and more particularly, a two-speed transmission for an electric vehicle. Generally, the two-speed transmission includes an input shaft having a first end for connection with an electric motor for powering the vehicle and a second end opposite the first end. An output shaft is also provided for connection with a final drive unit of the vehicle. A planetary gear set selectively couples the input shaft and the output shaft. The planetary gear set provides two forward gear ratios and neutral. The planetary gear set includes at least one sun gear connected to the input shaft between the first end of the input shaft and the second end of the input shaft. At least one pinion is disposed radially outwardly of the at least one sun gear such that the at least one pinion is in meshing engagement with the at least one sun gear. The planetary gear set also includes at least one ring gear meshingly engaged with the at least one pinion. The at least one ring gear circumscribes at least a portion of the at least one pinion. The planetary gear set further includes a carrier connected to the output shaft such that rotation of the carrier drives the output shaft. The carrier also supports the at least one pinion radially about the at least one sun gear.

The two-speed transmission also includes one or more elements that rotatably couple different combinations of the at least one sun gear, the at least one pinion, the at least one ring gear, the input shaft, and the carrier with one another or to a ground such as a transmission housing. These elements may include various combinations of clutches, multi-plate wet clutch assemblies, brakes, and dog clutches. The various configurations of these elements are described more fully below and results in unique power flows through the two-speed transmission.

Advantageously, the two-speed transmission, in all of the configurations described below, provides extended range for electric vehicles when compared with single gear ratio transmissions for any given battery size. The two-speed transmission disclosed allows for a smaller electric motor to be fitted in the electric vehicle because the first gear ratio can provide sufficient torque to launch the electric vehicle with the smaller electric motor and the second gear ratio provides sufficient power to drive the vehicle to highway speeds. The disclosed power flows reduce the number of mechanical components and control components and provide a two-speed transmission with minimal energy losses. Accordingly, battery size and cost can be further reduced with the use of smaller electric motors.

DRAWINGS

The features and advantages described above and other features and advantages of the present disclosure will be readily appreciated, as the same becomes better understood by reference to the following detailed description when considered in connection with the accompanying drawings. These drawings are for illustrative purposes of only select embodiments and not all possible implementations and are not intended to limit the scope of the present disclosure, wherein.

DETAILED DESCRIPTION

Figure 1:
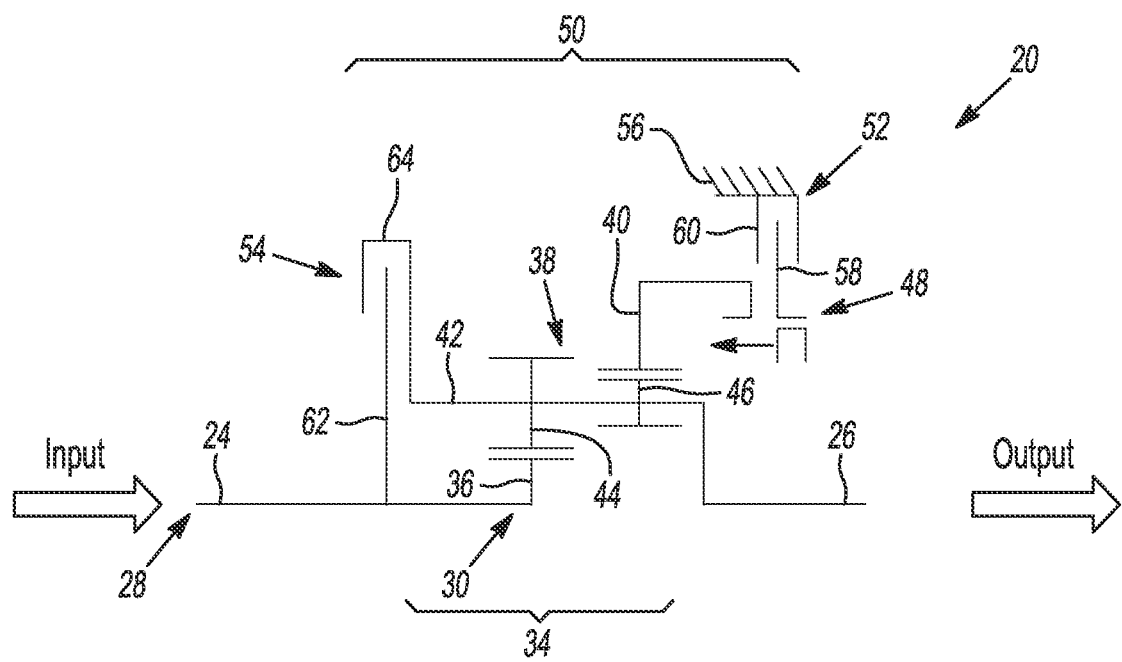
FIG. 1 is a transmission power flow diagram illustrating an exemplary two-speed transmission constructed in accordance with the subject disclosure.
Figure 1:
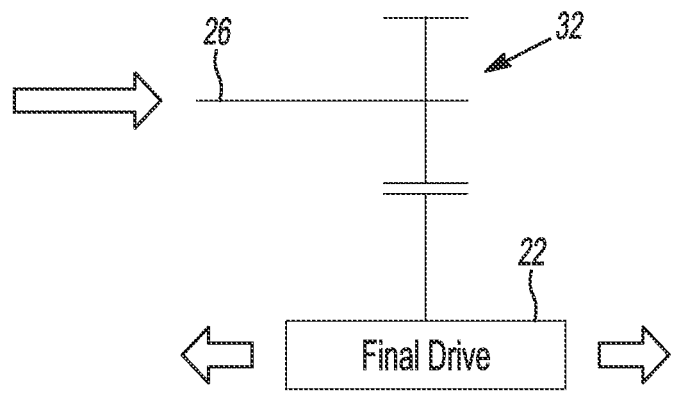

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring to the figures generally, several configurations and power flows for a two-speed transmission 20 are presented. Such transmissions 20 may find utility when coupled with an electric motor powering a vehicle by improving the efficiency of the vehicle while concurrently reducing cost. These new results are achieved because the disclosed power flows enable vehicle launch and high-speed driving using a smaller electric motor. Two forward gear ratios are provided to supply sufficient torque to launch the vehicle in a lower gear ratio and to supply sufficient rotational speed for highway driving in a higher gear ratio. Accordingly, a smaller electric motor can be fitted in the vehicle, which has reduced energy consumption over large electric motors. Thus, the range of the electric vehicle can be increased for a given battery size. Alternatively, smaller batteries can be fitted to the vehicle without decreasing range, which reduces the overall weight and cost of the vehicle. The weight reduction advantages and the reduced energy consumption of smaller electric motors yield increases in efficiency.

Referring to FIG. 1, the two-speed transmission 20 illustrated is coupled to a final drive unit 22 such as a differential. The final drive unit 22 operates to direct power from the two-speed transmission 20 to one or more wheels of the vehicle. The two-speed transmission 20 includes an input shaft 24 and an output shaft 26. The input shaft 24 has a first end 28 and a second end 30. The first end 28 of the input shaft 24 is provided to couple with the electric motor of the vehicle. The second end 30 of the input shaft 24 is axially spaced from the first end 28 of the input shaft 24. The output shaft 26 is provided to couple with the final drive unit 22 of the vehicle. An output gear set 32 is disposed between the output shaft 26 and the final drive unit 22. Rotation of the output shaft 26 drives rotation of the output gear set 32 and, thus, the final drive unit 22.

The two-speed transmission 20 includes a planetary gear set 34 selectively coupling the input shaft 24 and the output shaft 26. The planetary gear set 34 includes a sun gear 36, at least one double step pinion 38, a ring gear 40, and a carrier 42. The sun gear 36 is connected to the input shaft 24 proximate to the second end 30 of the input shaft 24. It should be appreciated that the sun gear 36 need not be disposed at the second end 30 of the input shaft 24. Instead, the input shaft 24 may extend beyond the sun gear 36 in a direction toward the output shaft 26.

The at least one double step pinion 38 has a first gear 44 and a second gear 46. The second gear 46 of the at least one double step pinion 38 is rotatably fixed with the first gear 44 of the at least one double step pinion 38 where rotation of the first gear 44 produces like rotation of the second gear 46.

The first gear 44 of the at least one double step pinion 38 has a first outer diameter and the second gear 46 of the at least one double step pinion 38 has a second outer diameter. The second outer diameter of the second gear 46 is less than the first outer diameter of the first gear 44. In other words, the first gear 44 of the at least one double step pinion 38 has a larger circumference than the second gear 46 of the at least one double step pinion 38.

The first gear 44 of the at least one double step pinion 38 is meshingly engaged with the sun gear 36 and is disposed radially outwardly of the sun gear 36. The second gear 46 of the at least one double step pinion 38 is meshingly engaged with the ring gear 40. As such, the ring gear 40 generally circumscribes the second gear 46 of the at least one double step pinion 38. The carrier 42 of the planetary gear set 34 supports the at least one double step pinion 38 and is connected to the output shaft 26. Accordingly, the second gear 46 of the at least one double step pinion 38 can run along the ring gear 40 such that the second gear 46 of the at least one double step pinion 38 orbits within the ring gear 40 along with the carrier 42. However, it should be appreciated that the at least one double step pinion 38 is free to rotate with respect to the carrier 42.

The two-speed transmission 20 in FIG. 1 includes a dog clutch 48 disposed adjacent the ring gear 40 of the planetary gear set 34. The dog clutch 48 presents a plurality of teeth (not shown) that interlockingly engage with the ring gear 40 when the dog clutch 48 is actuated. Accordingly, when the dog clutch 48 is engaged, the dog clutch 48 does not permit slip of the ring gear 40. It should further be appreciated that the teeth of the dog clutch 48 may directly engage the ring gear 40 or alternatively may engage another component that is rotatably fixed with the ring gear 40.

The two-speed transmission 20 also includes a multi-plate wet clutch assembly 50 including a brake 52 and a clutch 54. The brake 52 is fixed to a ground 56 such as a housing (not shown) of the two-speed transmission 20. The brake 52 includes a brake friction plate 58 connected to the dog clutch 48. The brake 52 provides a first gear ratio of the two-speed transmission 20 by selectively engaging the brake friction plate 58. When the brake 52 selectively engages the brake friction plate 58, the brake 52 resists rotation of the brake friction plate 58 with respect to the ground 56. This correspondingly restricts rotation of the ring gear 40 with respect to the ground 56 when the dog clutch 48 is engaged with the ring gear 40. More particularly, the brake 52 may include a brake caliper 60 that selectively engages the brake friction plate 58. The brake caliper 60 may be fixed to the ground 56 such as the housing of the two-speed transmission 20.

The clutch 54 includes a clutch friction plate 62 connected to the input shaft 24 between the first end 28 of the input shaft 24 and the sun gear 36 of the planetary gear set 34. The clutch 54 is connected to the carrier 42 of the planetary gear set 34. Accordingly, the clutch 54 provides a second gear ratio of the two-speed transmission 20 by selectively engaging the clutch friction plate 62 to rotatably couple the input shaft 24 and the sun gear 36 with the carrier 42. More particularly, the clutch 54 may include a clutch caliper 64 that selectively engages the clutch friction plate 62. The clutch caliper 64 may be connected to the carrier 42 of the planetary gear set 34. It should be appreciated that unlike the dog clutch 48, the brake 52 and the clutch 54 may allow some slip if desired. It should also be appreciated that the dog clutch 48 can advantageously disconnect the brake 52 from the ring gear 40 such that friction and inertia losses associated with rotating the brake friction plate 58 can be eliminated when the dog clutch 48 is not selectively engaged.

The multi-plate wet clutch assembly 50 of the two-speed transmission 20 provides a neutral state in response to the clutch 54 permitting free rotation of the clutch friction plate 62 and the brake 52 permitting free rotation of the brake friction plate 58 when the dog clutch 48 is not engaged. In the neutral state, input shaft 24 and the sun gear 36 rotate and drive rotation of the first gear 44 of the at least one double step pinion 38. Rotation of the at least one double step pinion 38 and thus the second gear 46 drives rotation of the ring gear 40. The ring gear 40 rotates freely in the neutral state because the dog clutch 48 and the brake 52 are not engaged. Thus, all of the torque supplied to the input shaft 24 goes to rotating the ring gear 40 so the carrier 42 is not rotationally driven. The carrier 42 is connected to the output shaft 26 so the output shaft 26 is not rotationally driven in the neutral state.

The first gear ratio is provided in response to the clutch 54 permitting free rotation of the clutch friction plate 62 and the brake 52 selectively engaging the brake friction plate 58 when the dog clutch 48 is engaged. The brake 52 and the dog clutch 48 lock the ring gear 40 in place so that the ring gear 40 remains stationary with respect to the ground 56. As the input shaft 24 and the sun gear 36 rotate and drive the first gear 44 of the at least one double step pinion 38, the at least one double step pinion 38 orbits within the ring gear 40, traveling in a circular arc, as the second gear 46 of the at least one double step pinion 38 runs along the ring gear 40. This orbital movement of the at least one double step pinion 38 with respect to the ring gear 40 drives rotation of the carrier 42 and thus the output shaft 26 at a rotational speed that is different than a rotational speed of the input shaft 24.

The second gear ratio is provided in response to the clutch 54 selectively engaging the clutch friction plate 62 and the brake 52 permitting free rotation of the brake friction plate 58 when the dog clutch 48 is not engaged. The clutch 54 locks rotation of the carrier 42 with the input shaft 24. Therefore, the carrier 42 and thus the output shaft 26 rotate at the same rotational speed as the input shaft 24. Accordingly, the second gear ratio may be a 1:1 ratio. It should also be noted that the dog clutch 48 is selectively disengaged from the ring gear 40 either before or during the clutch 54 engagement associated with an up-shift of the two-speed transmission 20 from the first gear ratio to second gear ratio (the 1-2 shift). By contrast, the dog clutch 48 is selectively engaged with the ring gear 40 either after or during the clutch 54 disengagement associated with a down-shift of the two-speed transmission 20 from the second gear ratio to the first gear ratio (the 2-1 shift) or from the second gear ratio to neutral (the 2-N shift). The difference in rotational speed of the output shaft 26 produced by the second gear ratio relative to the first gear ratio may be referred to as a gear ratio spread, which is vehicle and motor specific.

In another form of the configuration shown in FIG. 1, the two-speed transmission 20 may also include one or more idler gears (not shown). For example, an idler gear may be disposed between the first gear 44 of the at least one double step pinion 38 and the sun gear 36. Alternately or additionally, an idler gear may be disposed between the second gear 46 of the at least one double step pinion 38 and the ring gear 40. It should be appreciated that the idler gear(s) may be used to change the gear ratio spread between the first gear ratio and the second gear ratio and/or reverse the direction of rotation. In yet another form of the configuration show in FIG. 1, the at least one double step pinion 38 may be replaced by at least one single pinion gear (not shown) where a two-speed transmission 20 having a high reduction ratio is not necessary.

Figure 2:
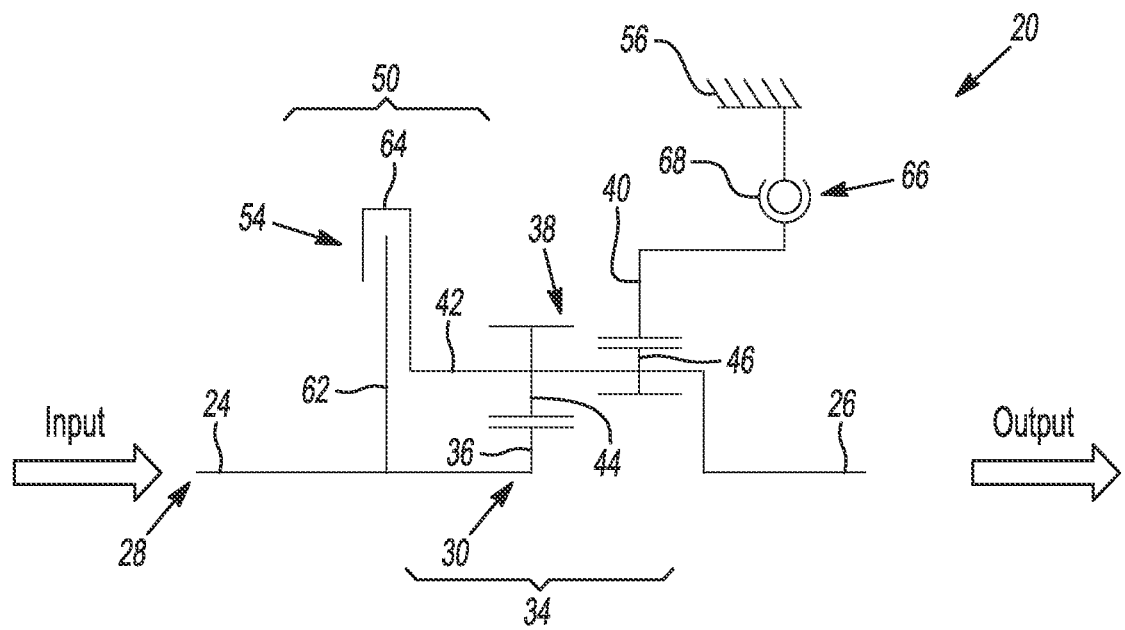
FIG. 2 is a transmission power flow diagram illustrating another exemplary two-speed transmission constructed in accordance with the subject disclosure.
Figure 2:
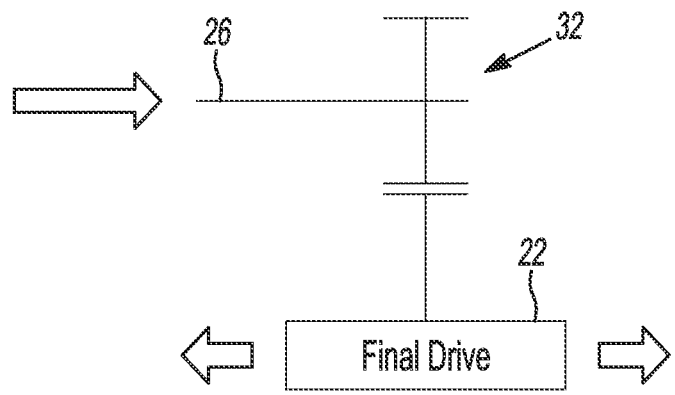

Now referring to FIG. 2, the two-speed transmission 20 illustrated in FIG. 1 can be modified where the dog clutch 48 and brake 52 are replaced by a band brake 66. In the configuration shown in FIG. 2, the band brake 66 of the two-speed transmission 20 is fixed to the ground 56 and includes a brake drum 68 connected to the ring gear 40. The band brake 66 provides the first gear ratio by selectively engaging the brake drum 68 to resist rotation of the ring gear 40 with respect to the ground 56. The clutch 54 is again connected to the carrier 42 of the planetary gear set 34 and the clutch friction plate 62 is connected to the input shaft 24 between the first end 28 of the input shaft 24 and the sun gear 36 of the planetary gear set 34. The clutch 54 provides the second gear ratio by selectively engaging the clutch friction plate 62 to rotatably couple the input shaft 24 and the sun gear 36 with the carrier 42.

The multi-plate wet clutch assembly 50 of the two-speed transmission 20 provides neutral in response to the band brake 66 permitting free rotation of the brake drum 68 and the clutch 54 permitting free rotation of the clutch friction plate 62. In the neutral state, input shaft 24 and the sun gear 36 rotate and drive rotation of the first gear 44 of the at least one double step pinion 38. Rotation of the at least one double step pinion 38 and thus the second gear 46 drives rotation of the ring gear 40. The ring gear 40 rotates freely in the neutral state because the band brake 66 is not engaged. Thus, all of the torque supplied to the input shaft 24 goes to rotating the ring gear 40 so the carrier 42 is not rotationally driven. The carrier 42 is connected to the output shaft 26 so the output shaft 26 is not rotationally driven in the neutral state.

The first gear ratio is provided in response to the band brake 66 selectively engaging the brake drum 68 and the clutch 54 permitting free rotation of the clutch friction plate 62. The band brake 66 locks the ring gear 40 in place so that the ring gear 40 remains stationary with respect to the ground 56. As the input shaft 24 and the sun gear 36 rotate and drive the first gear 44 of the at least one double step pinion 38, the at least one double step pinion 38 orbits within the ring gear 40, traveling in a circular arc, as the second gear 46 of the at least one double step pinion 38 runs along the ring gear 40. This orbital movement of the at least one double step pinion 38 with respect to the ring gear 40 drives rotation of the carrier 42 and thus the output shaft 26 at a rotational speed that is different than a rotational speed of the input shaft 24. The second gear ratio is provided in response to the band brake 66 permitting free rotation of the brake drum 68 and the clutch 54 selectively engaging the clutch friction plate 62. The clutch 54 locks rotation of the carrier 42 with the input shaft 24. Therefore, the carrier 42 and thus the output shaft 26 rotate at the same rotational speed as the input shaft 24. Accordingly, the second gear ratio may be a 1:1 ratio.

In another form of the configuration shown in FIG. 2, the two-speed transmission 20 may also include one or more idler gears (not shown). For example, an idler gear may be disposed between the first gear 44 of the at least one double step pinion 38 and the sun gear 36. Alternatively or additionally, an idler gear may be disposed between the second gear 46 of the at least one double step pinion 38 and the ring gear 40.

Figure 3:
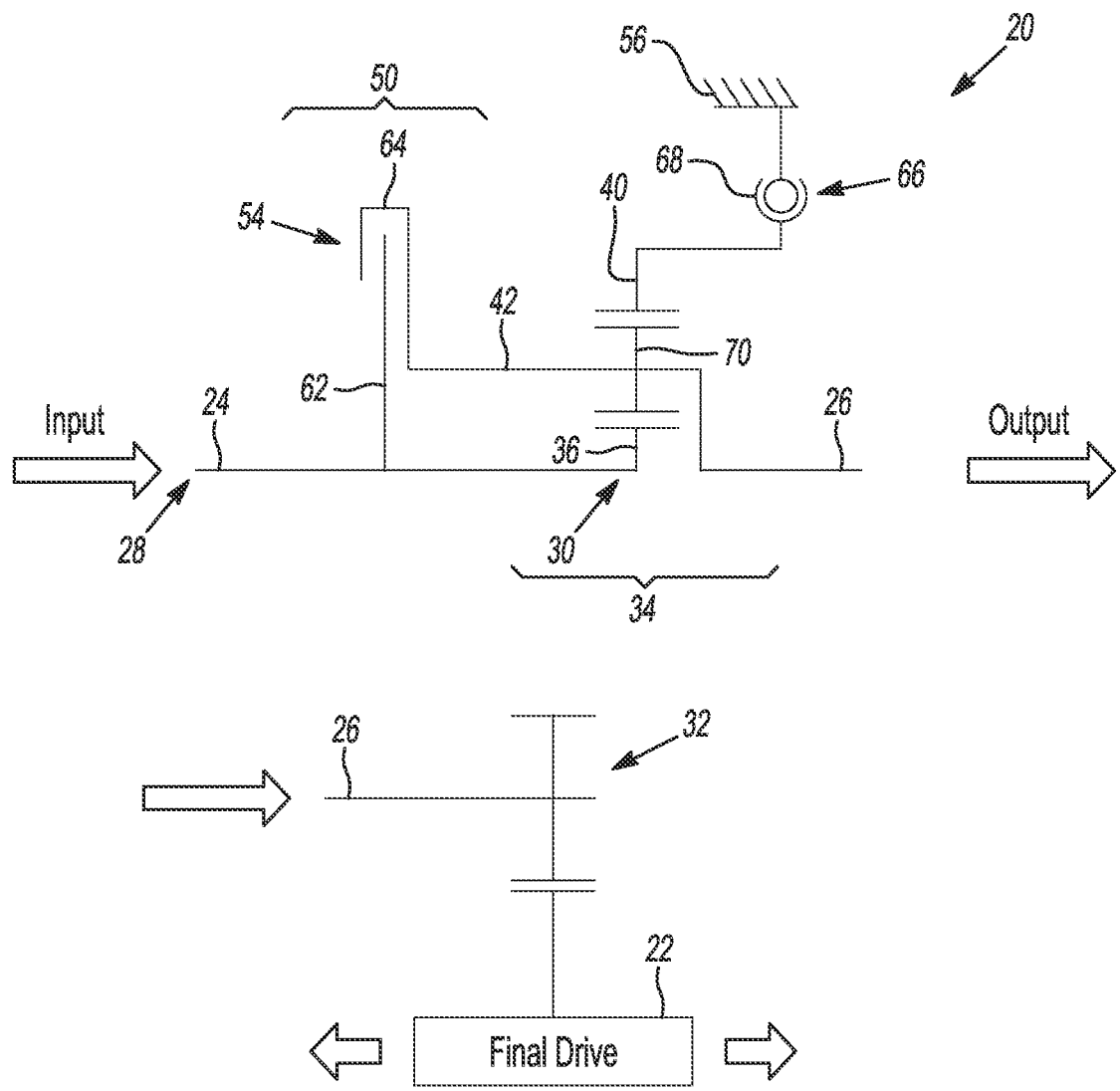
FIG. 3 is a transmission power flow diagram illustrating another exemplary two-speed transmission constructed in accordance with the subject disclosure.

Now referring to FIG. 3, the two-speed transmission 20 illustrated in FIG. 2 can be modified where the at least one double step pinion 38 is replaced by at least one single pinion gear 70. Particularly, such a configuration may be used where a two-speed transmission 20 having a high reduction ratio is not necessary. In the configuration shown in FIG. 3, the at least one single pinion gear 70 is meshingly engaged with the sun gear 36 and the ring gear 40. As such, the at least one single pinion gear 70 is disposed radially outwardly of the sun gear 36 and the ring gear 40 circumscribes the at least one single pinion gear 70 and the sun gear 36. It should be appreciated that multiple single pinion gears may be disposed about the sun gear 36 without departing from the subject disclosure. The carrier 42 of the planetary gear set 34 still supports the at least one single pinion gear 70 and is connected to the output shaft 26 and the clutch 54.

As with the configuration illustrated in FIG. 2, the band brake 66 of the configuration in FIG. 3 provides a first gear ratio by selectively engaging the brake drum 68 to resist rotation of the ring gear 40 with respect to the ground 56. The band brake 66 locks the ring gear 40 in place so that the ring gear 40 remains stationary with respect to the ground 56. As the input shaft 24 and the sun gear 36 rotate and drive the at least one single pinion gear 70, which orbits within the ring gear 40, traveling in a circular arc, as the at least one single pinion gear 70 runs along the ring gear 40. This orbital movement of the at least one single pinion gear 70 with respect to the ring gear 40 drives rotation of the carrier 42 and thus the output shaft 26 at a rotational speed that is different than a rotational speed of the input shaft 24.

The clutch 54 provides a second gear ratio by selectively engaging the clutch friction plate 62 to rotatably couple the input shaft 24 and the sun gear 36 with the carrier 42. The clutch 54 locks rotation of the carrier 42 with the input shaft 24. Therefore, the carrier 42 and thus the output shaft 26 rotate at the same rotational speed as the input shaft 24. Accordingly, the second gear ratio may be a 1:1 ratio. The band brake 66 and the clutch 54 provides neutral in response to the band brake 66 permitting free rotation of the brake drum 68 and the clutch 54 permitting free rotation of the clutch friction plate 62. In the neutral state, input shaft 24 and the sun gear 36 rotate and drive rotation of the at least one single pinion gear 70. Rotation of the at least one single pinion gear 70 drives rotation of the ring gear 40. The ring gear 40 rotates freely in the neutral state because the band brake 66 is not engaged. Thus, all of the torque supplied to the input shaft 24 goes to rotating the ring gear 40 so the carrier 42 is not rotationally driven. The carrier 42 is connected to the output shaft 26 so the output shaft 26 is not rotationally driven in the neutral state.

In another form of the configuration shown in FIG. 3, the two-speed transmission 20 may also include one or more idler gears. For example, an idler gear (not shown) may be disposed between the at least one single pinion gear 70 and the sun gear 36. Alternatively or additionally, an idler gear (not shown) may be disposed between the at least one single pinion gear 70 and the ring gear 40.

Figure 4:
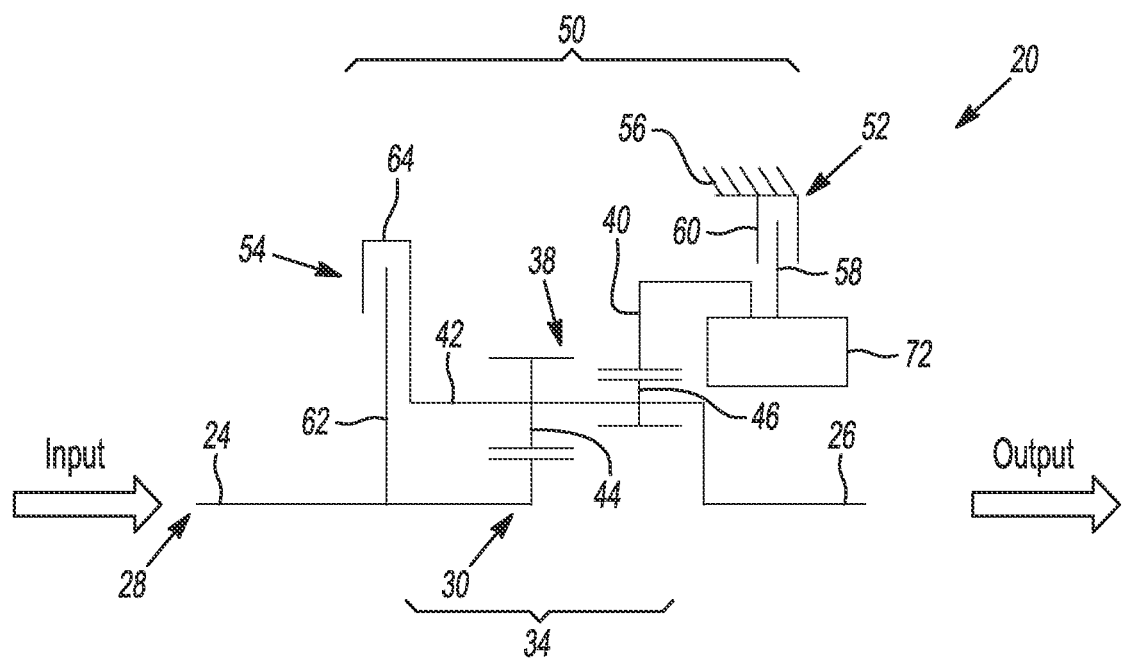
FIG. 4 is a transmission power flow diagram illustrating another exemplary two-speed transmission constructed in accordance with the subject disclosure.
Figure 4:
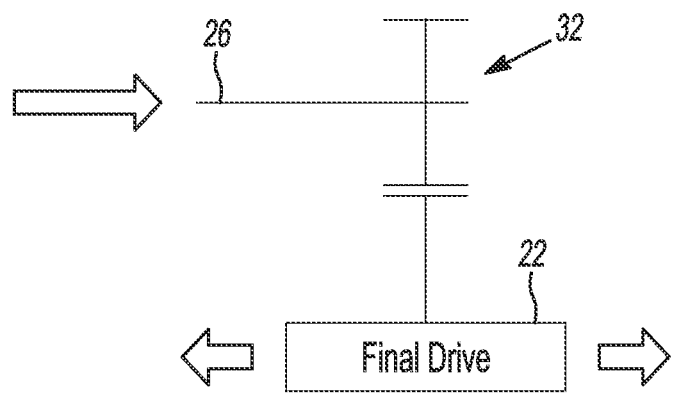

Now referring to FIG. 4, the two-speed transmission 20 illustrated in FIG. 1 can be modified where the dog clutch 48 is replaced by a mechanical diode 72. It should be appreciated that the mechanical diode 72 functions as a one way clutch. Although the structure of the mechanical diode 72 may take a variety of different forms, in one example, the mechanical diode 72 has five basic components. These components include a notch plate, a pocket plate, a plurality of struts, a plurality of springs, and a retaining ring. The notch plate and the pocket plate may generally be cylindrical and are co-axially disposed in a nested relationship. The notch plate has a plurality of notches and the pocket plate has a plurality of pockets that are arranged opposite the plurality of notches of the notch plate. The plurality of struts are pivotally connected to the pocket plate and are partially disposed in the plurality of pockets of the pocket plate. The plurality of springs are disposed in the plurality of pockets of the pocket plate such that the plurality of springs extend between the plurality of struts and the pocket plate. The plurality of springs bias the plurality of struts to an extended position where the plurality of struts project outwardly from the plurality of pockets to engage the plurality of notches of the notch plate. The plurality of struts slide over the plurality of notches in a first rotational direction, thus allowing clutch slip in the first rotational direction. However, the plurality of struts engage the plurality of notches in a second rotational direction, thus providing clutch lock-up in the second rotational direction. The retaining ring is disposed between the notch plate and the pocket plate and holds the notch plate and the pocket plate in place so that the notch plate cannot move axially relative to the pocket plate.

In the configuration shown in FIG. 4, the mechanical diode 72 is connected to the ring gear 40 and provides selective engagement of the ring gear 40. The two-speed transmission 20 has a multi-plate wet clutch assembly 50 including a brake 52 fixed to the ground 56 and a clutch 54 connected to the carrier 42. The brake 52 includes a brake friction plate 58 connected to the mechanical diode 72. Thus, the brake 52 provides a first gear ratio by selectively engaging the brake friction plate 58 to resist rotation of the ring gear 40 with respect to the ground 56 when the mechanical diode 72 is engaged with the ring gear 40. Again, the clutch 54 provides a second gear ratio by selectively engaging the clutch friction plate 62 to rotatably couple the input shaft 24 and the sun gear 36 with the carrier 42.

The multi-plate wet clutch assembly 50 of the two-speed transmission 20 shown in FIG. 4 provides a neutral state in response to the clutch 54 permitting free rotation of the clutch friction plate 62 and the brake 52 permitting free rotation of the brake friction plate 58 when the mechanical diode 72 is not engaged. In the neutral state, input shaft 24 and the sun gear 36 rotate and drive rotation of the first gear 44 of the at least one double step pinion 38. Rotation of the at least one double step pinion 38 and thus the second gear 46 drives rotation of the ring gear 40. The ring gear 40 rotates freely in the neutral state because the mechanical diode 72 and the brake 52 are not engaged. Thus, all of the torque supplied to the input shaft 24 goes to rotating the ring gear 40 so the carrier 42 is not rotationally driven. The carrier 42 is connected to the output shaft 26 so the output shaft 26 is not rotationally driven in the neutral state.

The first gear ratio is provided in response to the clutch 54 permitting free rotation of the clutch friction plate 62 and the brake 52 selectively engaging the brake friction plate 58 when the mechanical diode 72 is engaged. The brake 52 and the mechanical diode 72 lock the ring gear 40 in place so that the ring gear 40 remains stationary with respect to the ground 56. As the input shaft 24 and the sun gear 36 rotate and drive the first gear 44 of the at least one double step pinion 38, the at least one double step pinion 38 orbits within the ring gear 40, traveling in a circular arc, as the second gear 46 of the at least one double step pinion 38 runs along the ring gear 40. This orbital movement of the at least one double step pinion 38 with respect to the ring gear 40 drives rotation of the carrier 42 and thus the output shaft 26 at a rotational speed that is different than a rotational speed of the input shaft 24. The second gear ratio is provided in response to the clutch 54 selectively engaging the clutch friction plate 62 and the brake 52 permitting free rotation of the brake friction plate 58 when the mechanical diode 72 is not engaged. The clutch 54 locks rotation of the carrier 42 with the input shaft 24. Therefore, the carrier 42 and thus the output shaft 26 rotate at the same rotational speed as the input shaft 24. Accordingly, the second gear ratio may be a 1:1 ratio.

In another form of the configuration shown in FIG. 4, the two-speed transmission 20 may also include one or more idler gears (not shown). For example, an idler gear may be disposed between the first gear 44 of the at least one double step pinion 38 and the sun gear 36. Alternatively or additionally, an idler gear may be disposed between the second gear 46 of the at least one double step pinion 38 and the ring gear 40.

Figure 5:
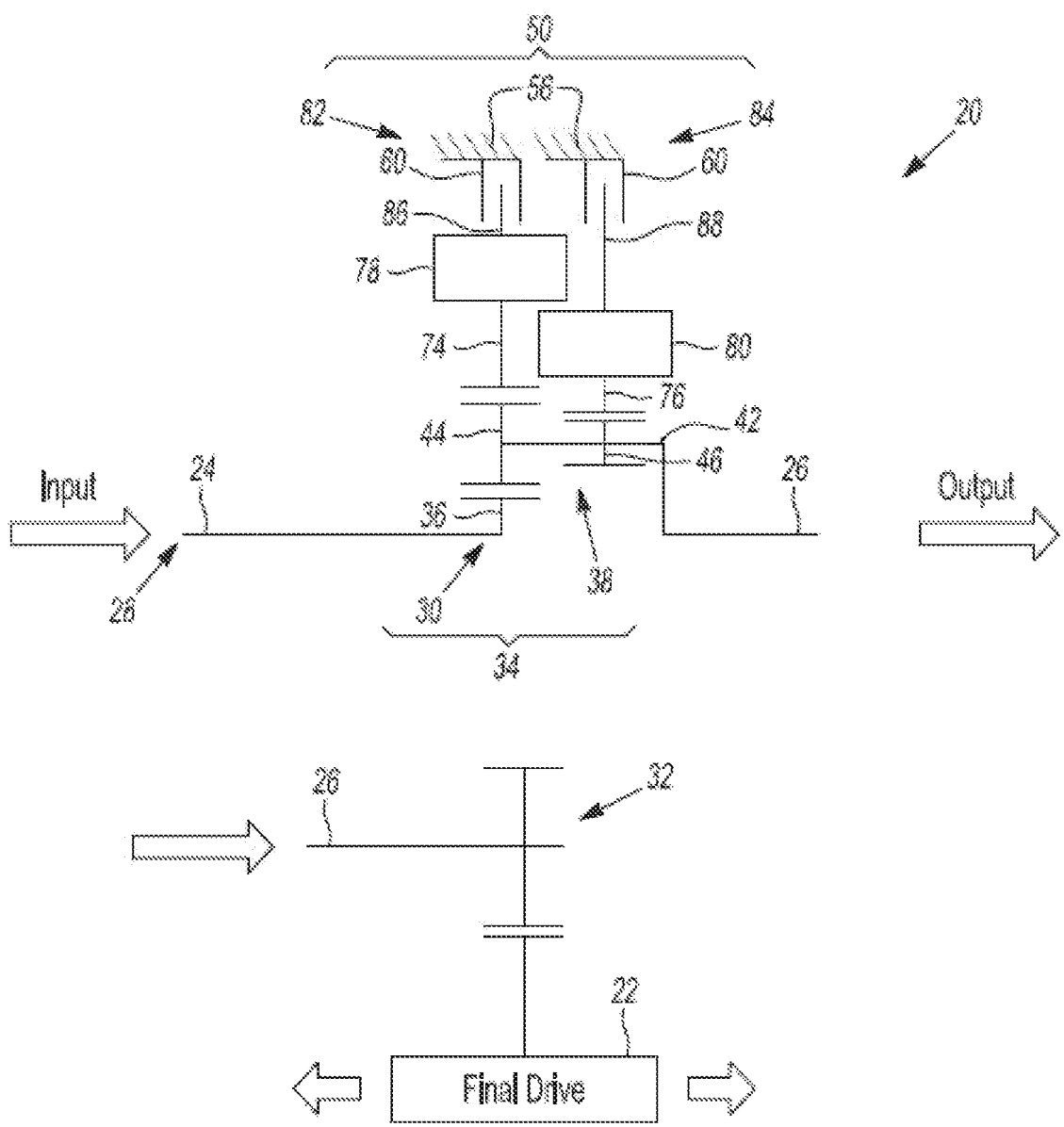
FIG. 5 is a transmission power flow diagram illustrating another exemplary two-speed transmission constructed in accordance with the subject disclosure.

Now referring to FIG. 5, another configuration of a two-speed transmission 20 is illustrated. Again, the two-speed transmission 20 includes an input shaft 24 having a first end 28 for connection with the electric motor and a second end 30 opposite the first end 28. An output shaft 26 for connection with the final drive unit 22 of the vehicle is also provided. An output gear set 32 is disposed between the output shaft 26 and the final drive unit 22. A planetary gear set 34 selectively couples the input shaft 24 and the output shaft 26 where the planetary gear set 34 includes a sun gear 36, at least one double step pinion 38, and a carrier 42. The sun gear 36 is connected to the input shaft 24 proximate to the second end 30 of the input shaft 24. The at least one double step pinion 38 has a first gear 44 and a second gear 46 rotatably fixed with the first gear 44. The first gear 44 has a first outer diameter and the second gear 46 has a second outer diameter. The second outer diameter of the second gear 46 is less than the first outer diameter of the first gear 44. The first gear 44 of the at least one double step pinion 38 is meshingly engaged with the sun gear 36 and is disposed radially outwardly of the sun gear 36.

A first ring gear 74 is meshingly engaged with the first gear 44 of the at least one double step pinion 38. As such, the first ring gear 74 circumscribes the first gear 44 of the at least one double step pinion 38 and the sun gear 36. A second ring gear 76 is meshingly engaged with the second gear 46 of the at least one double step pinion 38 and circumscribes the second gear 46 of the at least one double step pinion 38. The planetary gear set 34 includes a carrier 42 supporting the at least one double step pinion 38. Also, the carrier 42 is connected to the output shaft 26 and drives the output shaft 26 when rotated.

A first mechanical diode 78 is connected to the first ring gear 74 and provides selective engagement of the first ring gear 74. A second mechanical diode 80 is connected to the second ring gear 76 and provides selective engagement of the second ring gear 76. The two-speed transmission 20 also has a multi-plate wet clutch assembly 50. The multi-plate wet clutch assembly 50 includes a first brake 82 that is fixed to a ground 56 and a second brake 84 that is also fixed to the ground 56. The ground 56 remains stationary with respect to rotation of the input shaft 24 and the output shaft 26. Again, the ground 56 may be a housing of the two-speed transmission 20, for example. The first brake 82 includes a first brake friction plate 86 connected to the first mechanical diode 78. The second brake 84 includes a second brake friction plate 88 connected to the second mechanical diode 80.

The multi-plate wet clutch assembly 50 provides a first gear ratio in response to the second brake 84 selectively engaging the second brake friction plate 88 and the second mechanical diode 80 engaging the second ring gear 76. Thus, in the first gear ratio, the multi-plate wet clutch assembly 50 resists rotation of the second ring gear 76 with respect to the ground 56. The multi-plate wet clutch assembly 50 provides a second gear ratio in response to the first brake 82 selectively engaging the first brake friction plate 86 and the first mechanical diode 78 engaging the first ring gear 74. Accordingly, in the second gear ratio, the multi-plate wet clutch assembly 50 resists rotation of the first ring gear 74 with respect to the ground 56.

The multi-plate wet clutch assembly 50 provides a neutral state in response to the first brake 82 permitting free rotation of the first brake friction plate 86 and the second brake 84 permitting free rotation of the second brake friction plate 88. In the neutral state, input shaft 24 and the sun gear 36 rotate and drive rotation of the first gear 44 of the at least one double step pinion 38. Rotation of the at least one double step pinion 38 drives rotation of the first ring gear 74 and the second ring gear 76. The first ring gear 74 and the second ring gear 76 rotate freely in the neutral state because the first and second mechanical diodes 78, 80 and the first and second brakes 82, 84 are not engaged. Thus, all of the torque supplied to the input shaft 24 goes to rotating the first and second ring gears 74, 76 so the carrier 42 is not rotationally driven. The carrier 42 is connected to the output shaft 26 so the output shaft 26 is not rotationally driven in the neutral state.

The first gear ratio is provided in response to the first brake 82 permitting free rotation of the first brake friction plate 86 when the first mechanical diode 78 is disengaged and the second brake 84 selectively engaging the second brake friction plate 88 when the second mechanical diode 80 is engaged. The second brake 84 and the second mechanical diode 80 lock the second ring gear 76 in place so that the second ring gear 76 remains stationary with respect to the ground 56. As the input shaft 24 and the sun gear 36 rotate and drive the first gear 44 of the at least one double step pinion 38, the at least one double step pinion 38 orbits within the second ring gear 76, traveling in a circular arc, as the second gear 46 of the at least one double step pinion 38 runs along the second ring gear 76. This orbital movement of the at least one double step pinion 38 with respect to the second ring gear 76 drives rotation of the carrier 42 and thus the output shaft 26 at a rotational speed that may be different than a rotational speed of the input shaft 24. At the same time, the first ring gear 74 is allowed to freely rotate.

The second gear ratio is provided in response to the first brake 82 selectively engaging the first brake friction plate 86 when the first mechanical diode 78 is engaged and the second brake 84 permitting free rotation of the second brake friction plate 88 when the second mechanical diode 80 is disengaged. The first brake 82 and the first mechanical diode 78 lock the first ring gear 74 in place so that the first ring gear 74 remains stationary with respect to the ground 56. As the input shaft 24 and the sun gear 36 rotate and drive the first gear 44 of the at least one double step pinion 38, the at least one double step pinion 38 orbits within the first ring gear 74, traveling in a circular arc, as the first gear 44 of the at least one double step pinion 38 runs along the first ring gear 74. This orbital movement of the at least one double step pinion 38 with respect to the first ring gear 74 drives rotation of the carrier 42 and thus the output shaft 26 at a rotational speed that may be different than a rotational speed of the input shaft 24. At the same time, the second ring gear 76 is allowed to freely rotate.

In another form of the configuration shown in FIG. 5, the two-speed transmission 20 may also include one or more idler gears (not shown). For example, an idler gear may be disposed between the first gear 44 of the at least one double step pinion 38 and the sun gear 36. Alternatively or additionally, an idler gear may be disposed between the first gear 44 of the at least one double step pinion 38 and the first ring gear 74. Similarly, an idler gear may be disposed between the second gear 46 of the at least one double step pinion 38 and the second ring gear 76. It should be appreciated that one or none of the idler gears described above may be included in the two-speed transmission 20. It should also be appreciated that various combinations of the idler gears described above may be employed where all such combinations are considered to be within the scope of the subject disclosure.

Figure 6:
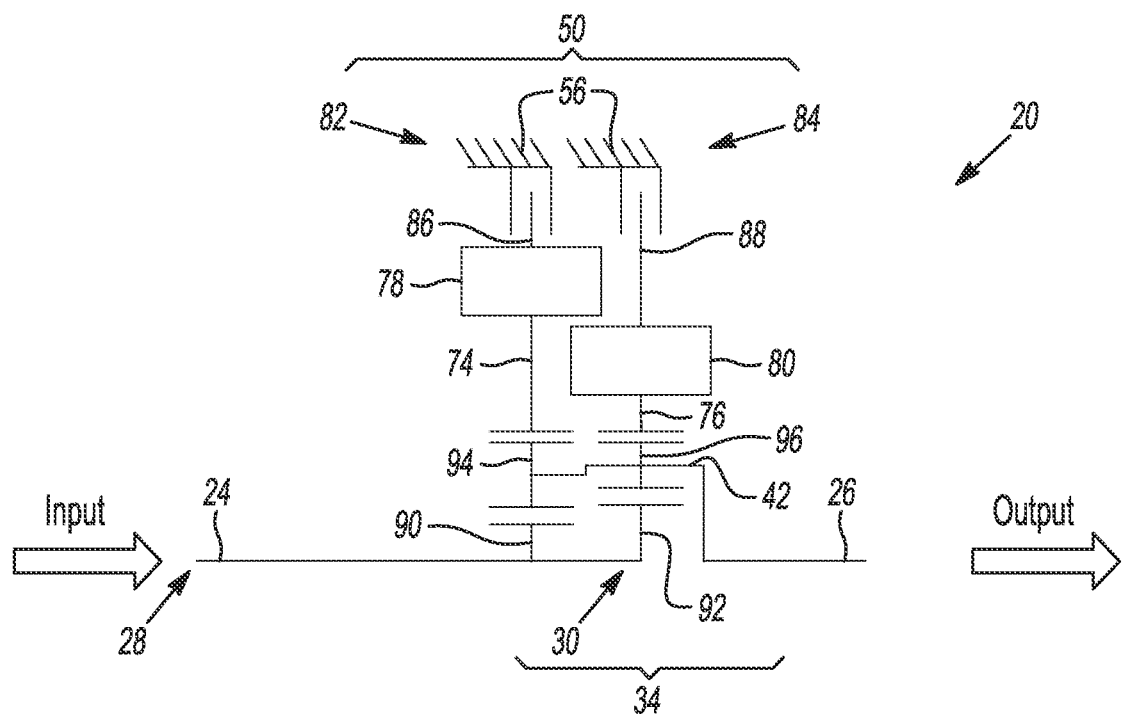
FIG. 6 is a transmission power flow diagram illustrating another exemplary two-speed transmission constructed in accordance with the subject disclosure.
Figure 6:
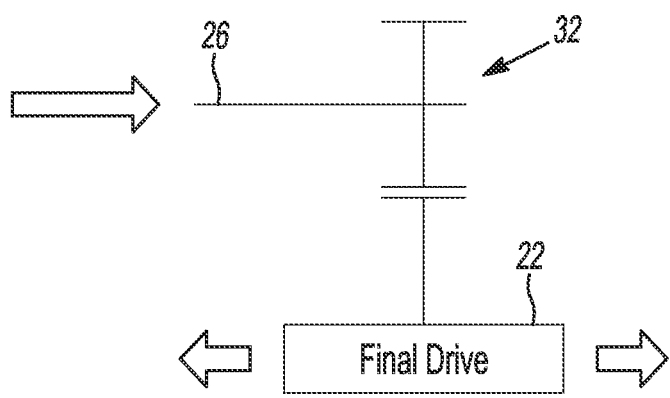

Now referring to FIG. 6, another configuration of a two-speed transmission 20 is illustrated. Again, the two-speed transmission 20 includes an input shaft 24 having a first end 28 for connection with the electric motor powering the vehicle and a second end 30 opposite the first end 28. An output shaft 26 for connection with the final drive unit 22 of the vehicle is also provided. An output gear set 32 is disposed between the output shaft 26 and the final drive unit 22. A planetary gear set 34 selectively couples the input shaft 24 and the output shaft 26.

The planetary gear set 34 includes a first sun gear 90 and a second sun gear 92. The first sun gear 90 is connected to the input shaft 24 between the first end 28 of the input shaft 24 and the second end 30 of the input shaft 24. The second sun gear 92 is connected to the input shaft 24 between the first sun gear 90 and the second end 30 of the input shaft 24. The planetary gear set 34 also includes at least a first pinion gear 94 in meshing engagement with the first sun gear 90 and a second pinion gear 96 in meshing engagement with the second sun gear 92. The first pinion gear 94 has a first outer diameter and the second pinion gear 96 has a second outer diameter. The second outer diameter of the second pinion gear 96 is less than the first outer diameter of the first pinion gear 94. In other words, the second pinion gear 96 has a smaller circumference than the first pinion gear 94.

The planetary gear set 34 also includes a first ring gear 74 meshingly engaged with the first pinion gear 94 and a second ring gear 76 meshingly engaged with the second pinion gear 96. The first ring gear 74 has a first inner diameter that circumscribes the first pinion gear 94 and the first sun gear 90. Similarly, the second ring gear 76 has a second inner diameter that circumscribes the second pinion gear 96 and the second sun gear 92. Further, the first ring gear 74 and the second ring gear 76 are co-axially aligned and the second inner diameter of the second ring gear 76 is equal to the first inner diameter of the first ring gear 74.

The planetary gear set 34 includes a carrier 42 supporting at least the first pinion gear 94 and the second pinion gear 96. More specifically, the first pinion gear 94 and the second pinion gear 96 are radially offset with respect to one another such that the smaller second pinion gear 96 still meshes with the second ring gear 76. It should be appreciated that the second pinion gear 96 would not mesh with the second ring gear 76 if this offset were not provided given the co-axial alignment and symmetry of the inner diameters of the first ring gear 74 and the second ring gear 76. It should also be appreciated that although the first pinion gear 94 and the second pinion gear 96 are supported on the carrier 42, they each may rotate with respect to the carrier 42 and independently of one another.

A first mechanical diode 78 is connected to the first ring gear 74 providing selective engagement of the first ring gear 74. A second mechanical diode 80 is connected to the second ring gear 76 providing selective engagement of the second ring gear 76. The two-speed transmission 20 further includes a multi-plate wet clutch assembly 50 including a first brake 82 fixed to a ground 56 and a second brake 84 also fixed to the ground 56. The first brake 82 includes a first brake friction plate 86 connected to the first mechanical diode 78 and the second brake 84 includes a second brake friction plate 88 connected to the second mechanical diode 80.

The multi-plate wet clutch assembly 50 provides a first gear ratio in response to the second brake 84 selectively engaging the second brake friction plate 88 and the second mechanical diode 80 engaging the second ring gear 76. As such, in the first gear ratio, the multi-plate wet clutch assembly 50 resists rotation of the second ring gear 76 with respect to the ground 56. The multi-plate wet clutch assembly 50 provides a second gear ratio in response to the first brake 82 selectively engaging the first brake friction plate 86 and the first mechanical diode 78 engaging the first ring gear 74. As such, in the second gear ratio, the multi-plate wet clutch assembly 50 resists rotation of the first ring gear 74 with respect to the ground 56.

The multi-plate wet clutch assembly 50 provides a neutral state in response to the first brake 82 permitting free rotation of the first brake friction plate 86 and the second brake 84 permitting free rotation of the second brake friction plate 88. In the neutral state, input shaft 24, the first sun gear 90, and the second sun gear 92 rotate and drive rotation of the first pinion gear 94 and the second pinion gear 96. Rotation of the first pinion gear 94 drives rotation of the first ring gear 74 and rotation of the second pinion gear 96 drives rotation of the second ring gear 76. The first ring gear 74 and the second ring gear 76 rotate freely in the neutral state because the first and second mechanical diodes 78, 80 and the first and second brakes 82, 84 are not engaged. Thus, all of the torque supplied to the input shaft 24 goes to rotating the first and second ring gears 74, 76 so the carrier 42 is not rotationally driven. The carrier 42 is connected to the output shaft 26 so the output shaft 26 is not rotationally driven in the neutral state.

The first gear ratio is provided in response to the first brake 82 permitting free rotation of the first brake friction plate 86 when the first mechanical diode 78 is disengaged and the second brake 84 selectively engaging the second brake friction plate 88 when the second mechanical diode 80 is engaged. The second brake 84 and the second mechanical diode 80 lock the second ring gear 76 in place so that the second ring gear 76 remains stationary with respect to the ground 56. As the input shaft 24 and the second sun gear 92 rotate and drive the second pinion gear 96, the second pinion gear 96 orbits within the second ring gear 76, traveling in a circular arc, as second pinion gear 96 runs along the second ring gear 76. This orbital movement of the second pinion gear 96 with respect to the second ring gear 76 drives rotation of the carrier 42 and thus the output shaft 26 at a rotational speed that may be different than a rotational speed of the input shaft 24. At the same time, the first sun gear 90 rotates and drives the first pinion gear 94, which in turn drives rotation of the first ring gear 74. The first ring gear 74 is allowed to freely rotate because the first mechanical diode 78 and the first brake 82 are disengaged.

The second gear ratio is provided in response to the first brake 82 selectively engaging the first brake friction plate 86 when the first mechanical diode 78 is engaged and the second brake 84 permitting free rotation of the second brake friction plate 88 when the second mechanical diode 80 is disengaged. The first brake 82 and the first mechanical diode 78 lock the first ring gear 74 in place so that the first ring gear 74 remains stationary with respect to the ground 56. As the input shaft 24 and the first sun gear 90 rotate and drive the first pinion gear 94, the first pinion gear 94 orbits within the first ring gear 74, traveling in a circular arc, as first pinion gear 94 runs along the first ring gear 74. This orbital movement of the first pinion gear 94 with respect to the first ring gear 74 drives rotation of the carrier 42 and thus the output shaft 26 at a rotational speed that may be different than a rotational speed of the input shaft 24. At the same time, the second sun gear 92 rotates and drives the second pinion gear 96, which in turn drives rotation of the second ring gear 76. The second ring gear 76 is allowed to freely rotate because the second mechanical diode 80 and the second brake 84 are disengaged.

In another form of the configuration shown in FIG. 6, the two-speed transmission 20 may also include one or more idler gears (not shown). For example, an idler gear may be disposed between the first pinion gear 94 and the first sun gear 90. An idler gear may also be disposed between the second pinion gear 96 and the second sun gear 92. Alternatively or additionally, an idler gear may be disposed between the first pinion gear 94 and the first ring gear 74. Similarly, an idler gear may be disposed between the second pinion gear 96 and the second ring gear 76. It should be appreciated that one or none of the idler gears described above may be included in the two-speed transmission 20. It should also be appreciated that various combinations of the idler gears described above may be employed where all such combinations are considered to be within the scope of the subject disclosure.

Figure 7:
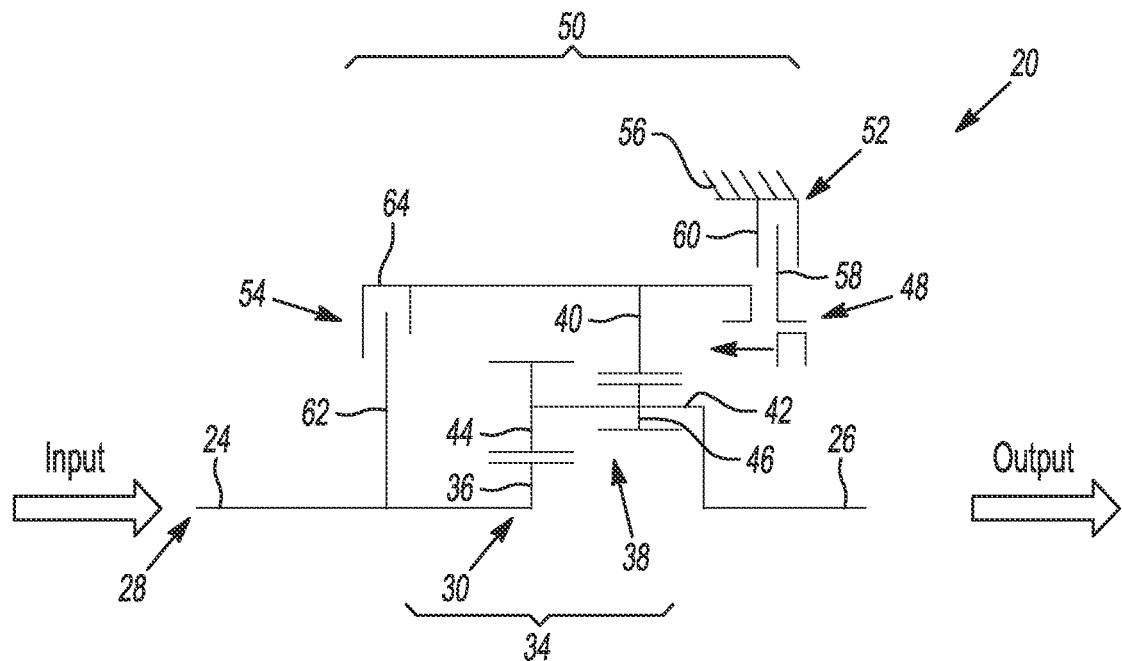
FIG. 7 is a transmission power flow diagram illustrating another exemplary two-speed transmission constructed in accordance with the subject disclosure.
Figure 7:
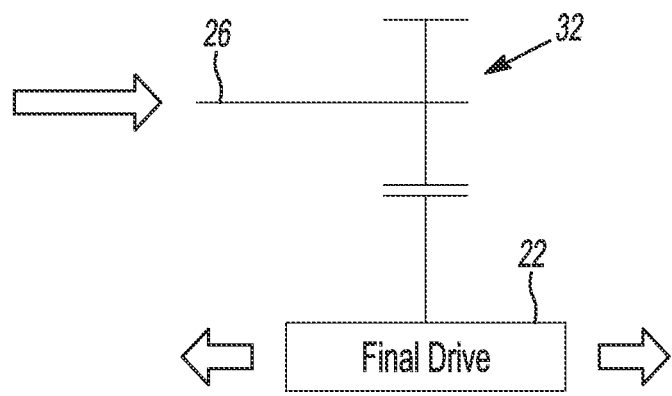

Now referring to FIG. 7, another configuration of a two-speed transmission 20 is illustrated. The two-speed transmission 20 includes an input shaft 24 and an output shaft 26. The input shaft 24 has a first end 28 for connection with the electric motor and a second end 30 opposite the first end 28. The output shaft 26 is provided for connection with the final drive unit 22 of the vehicle. An output gear set 32 is disposed between the output shaft 26 and the final drive unit 22. The two-speed transmission 20 also includes a planetary gear set 34 selectively coupling the input shaft 24 and the output shaft 26. The planetary gear set 34 includes a sun gear 36, at least one double step pinion 38, a ring gear 40, and a carrier 42. The sun gear 36 is connected to the input shaft 24 proximate to the second end 30 of the input shaft 24. The at least one double step pinion 38 has a first gear 44 and a second gear 46. The second gear 46 of the at least one double step pinion 38 is rotatably fixed with the first gear 44 of the at least one double step pinion 38. The first gear 44 has a first outer diameter and the second gear 46 has a second outer diameter. The second outer diameter of the second gear 46 is less than the first outer diameter of the first gear 44. The first gear 44 of the at least one double step pinion 38 is meshingly engaged with the sun gear 36 and is disposed radially outwardly of the sun gear 36.

The ring gear 40 is meshingly engaged with the second gear 46 of the at least one double step pinion 38. Accordingly, the ring gear 40 circumscribes the second gear 46 of the at least one double step pinion 38. The carrier 42 supports the at least one double step pinion 38. The carrier 42 is connected to the output shaft 26 such that rotation of the carrier 42 drives the output shaft 26. A dog clutch 48 is disposed adjacent the ring gear 40. The dog clutch 48 presents a plurality of teeth providing selective interlocking engagement with the ring gear 40 whether directly or through an intermediary component rotatably fixed with the ring gear 40.

The two-speed transmission 20 also has a multi-plate wet clutch assembly 50 including a brake 52 fixed to a ground 56 and a clutch 54 rotatably coupled with the ring gear 40. The brake 52 includes a brake friction plate 58 connected to the dog clutch 48. The brake 52 provides a first gear ratio by selectively engaging the brake friction plate 58 to resist rotation of the ring gear 40 with respect to the ground 56 when the dog clutch 48 is engaged with the ring gear 40. The clutch 54 includes a clutch friction plate 62 connected to the input shaft 24 between the first end 28 of the input shaft 24 and the sun gear 36 of the planetary gear set 34. The clutch 54 provides a second gear ratio by selectively engaging the clutch friction plate 62 to rotatably couple the input shaft 24 and the sun gear 36 with the ring gear 40. Accordingly, in this configuration, the ring gear 40 is locked in rotation with the input shaft 24 in response to the clutch 54 selectively engaging of the clutch friction plate 62. This occurs because the clutch 54 is connected to the ring gear 40. More particularly, the clutch 54 may include a clutch caliper 64 that selectively engages the clutch friction plate 62. This clutch caliper 64 may be connected to the ring gear 40 to rotatably couple the clutch 54 to the ring gear 40.

The multi-plate wet clutch assembly 50 of the two-speed transmission 20 provides a neutral state in response to the brake 52 permitting free rotation of the brake friction plate 58 and the clutch 54 permitting free rotation of the clutch friction plate 62. In the neutral state, input shaft 24 and the sun gear 36 rotate and drive rotation of the first gear 44 of the at least one double step pinion 38. Rotation of the at least one double step pinion 38 and thus the second gear 46 drives rotation of the ring gear 40. The ring gear 40 rotates freely in the neutral state because the dog clutch 48 and the brake 52 are not engaged. Thus, all of the torque supplied to the input shaft 24 goes to rotating the ring gear 40. The clutch 54 is disengaged so the carrier 42 is not rotationally driven. The carrier 42 is connected to the output shaft 26 so the output shaft 26 is not rotationally driven in the neutral state.

The first gear ratio is provided in response to the clutch 54 permitting free rotation of the clutch friction plate 62 and the brake 52 selectively engaging the brake friction plate 58 when the dog clutch 48 is engaged. The brake 52 and the dog clutch 48 lock the ring gear 40 in place so that the ring gear 40 remains stationary with respect to the ground 56. As the input shaft 24 and the sun gear 36 rotate and drive the first gear 44 of the at least one double step pinion 38, the at least one double step pinion 38 orbits within the ring gear 40, traveling in a circular arc, as the second gear 46 of the at least one double step pinion 38 runs along the ring gear 40. This orbital movement of the at least one double step pinion 38 with respect to the ring gear 40 drives rotation of the carrier 42 and thus the output shaft 26 at a rotational speed that is different than a rotational speed of the input shaft 24.

The second gear ratio is provided in response to the clutch 54 selectively engaging the clutch friction plate 62 and the brake 52 permitting free rotation of the brake friction plate 58 when the dog clutch 48 is not engaged. The clutch 54 locks rotation of the ring gear 40 with the input shaft 24. Accordingly, the ring gear 40 rotates with the sun gear 36. Rotation of the ring gear 40 drives rotation of the second gear 46 of the at least one double step pinion 38, which in turn drives rotation of the carrier 42 and thus the output shaft 26. In other words, the entire planetary gear set 34 rotates with the input shaft 24 when the second gear ratio is selected.

In another configuration of the two-speed transmission 20 shown in FIG. 7, one or more idler gears (not shown) may be employed. For example, an idler gear may be disposed between the first gear 44 of the at least one double step pinion 38 and the sun gear 36. Alternatively or additionally, an idler gear may be disposed between the second gear 46 of the at least one double step pinion 38 and the ring gear 40.

Figure 8:
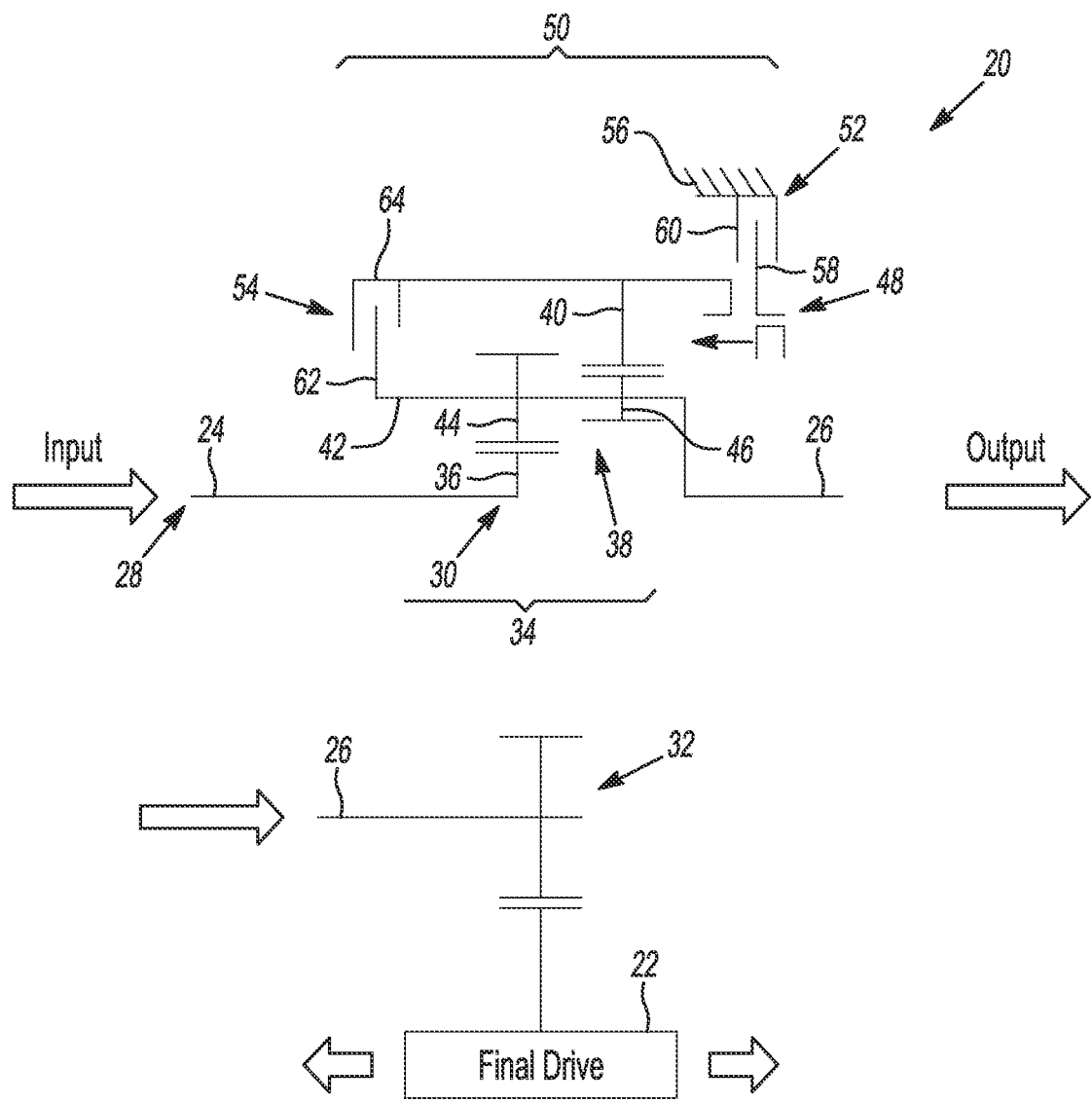
FIG. 8 is a transmission power flow diagram illustrating another exemplary two-speed transmission constructed in accordance with the subject disclosure.

Now referring to FIG. 8, the two-speed transmission 20 of FIG. 7 may be modified where the clutch friction plate 62 is connected to the carrier 42 of the planetary gear set 34 instead of the input shaft 24. In the two-speed transmission 20 illustrated in FIG. 8, the multi-plate wet clutch assembly 50 includes the brake 52 fixed to the ground 56 and the clutch 54 rotatably coupled with the ring gear 40. The brake 52 of the multi-plate wet clutch assembly 50 provides a first gear ratio by selectively engaging the brake friction plate 58 to resist rotation of the ring gear 40 with respect to the ground 56 when the dog clutch 48 is engaged with the ring gear 40. The clutch friction plate 62 is connected to the carrier 42 of the planetary gear set 34. The clutch 54 provides a second gear ratio by selectively engaging the clutch friction plate 62 to rotatably couple the carrier 42 and the ring gear 40. Because the carrier 42 is also connected to the output shaft 26, selective engagement of the clutch friction plate 62 essentially locks the output shaft 26 in rotation with the ring gear 40 such that the ring gear 40 drives the output shaft 26.

The multi-plate wet clutch assembly 50 provides a neutral state in response to the brake 52 permitting free rotation of the brake friction plate 58 and the clutch 54 permitting free rotation of the clutch friction plate 62. In the neutral state, input shaft 24 and the sun gear 36 rotate and drive rotation of the first gear 44 of the at least one double step pinion 38. Rotation of the at least one double step pinion 38 and thus the second gear 46 drives rotation of the ring gear 40. The ring gear 40 rotates freely in the neutral state because the dog clutch 48 and the brake 52 are not engaged. Thus, all of the torque supplied to the input shaft 24 goes to rotating the ring gear 40. The clutch 54 is disengaged so the carrier 42 is not rotationally driven. The carrier 42 is connected to the output shaft 26 so the output shaft 26 is not rotationally driven in the neutral state.

The first gear ratio is provided in response to the clutch 54 permitting free rotation of the clutch friction plate 62 and the brake 52 selectively engaging the brake friction plate 58 when the dog clutch 48 is engaged. The brake 52 and the dog clutch 48 lock the ring gear 40 in place so that the ring gear 40 remains stationary with respect to the ground 56. As the input shaft 24 and the sun gear 36 rotate and drive the first gear 44 of the at least one double step pinion 38, the at least one double step pinion 38 orbits within the ring gear 40, traveling in a circular arc, as the second gear 46 of the at least one double step pinion 38 runs along the ring gear 40. This orbital movement of the at least one double step pinion 38 with respect to the ring gear 40 drives rotation of the carrier 42 and thus the output shaft 26 at a rotational speed that is different than a rotational speed of the input shaft 24.

The second gear ratio is provided in response to the clutch 54 selectively engaging the clutch friction plate 62 and the brake 52 permitting free rotation of the brake friction plate 58 when the dog clutch 48 is not engaged. The clutch 54 locks rotation of the ring gear 40 with the carrier 42. Rotation of the at least one double step pinion 38 drives rotation of the ring gear 40, which in turn drives rotation of the carrier 42 and thus the output shaft 26. In other words, the ring gear 40 and the carrier 42 rotate together when the second gear ratio is selected.

Figure 9:
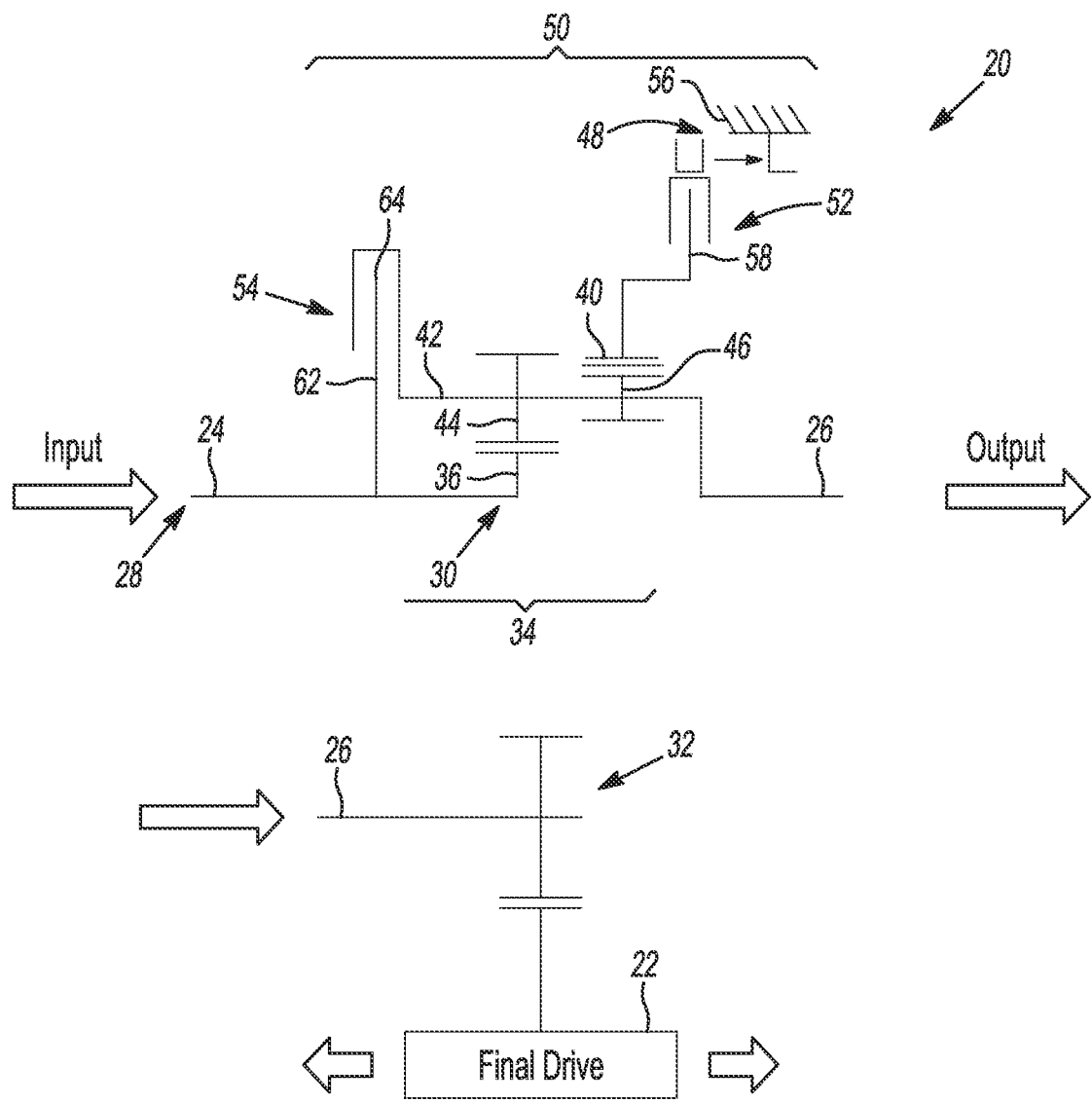
FIG. 9 is a transmission power flow diagram illustrating another exemplary two-speed transmission constructed in accordance with the subject disclosure.

Now referring to FIG. 9, the two-speed transmission 20 of FIG. 1 may be modified where the dog clutch 48 is connected to the brake 52. In this configuration, the dog clutch 48 is arranged in selective engagement with the ground 56 to selectively couple the brake 52 to the ground 56. The ground 56 may be for example a housing (not shown) of the two-speed transmission 20. More specifically, the dog clutch 48 presents a plurality of teeth that may engage a component of the dog clutch 48 that is fixed to the ground 56. When these teeth are interlockingly engaged, the dog clutch 48 is locked in place with respect to the ground 56.

The two-speed transmission 20 shown in FIG. 9 also includes a multi-plate wet clutch assembly 50 including a brake 52 and a clutch 54. The brake 52 includes a brake friction plate 58 connected to the ring gear 40. The brake 52 provides a first gear ratio of the two-speed transmission 20 by selectively engaging the brake friction plate 58. When the brake 52 selectively engages the brake friction plate 58 and when the dog clutch 48 selectively engages the ground 56, the brake 52 resists rotation of the brake friction plate 58 with respect to the ground 56. This correspondingly restricts rotation of the ring gear 40 with respect to the ground 56 when the dog clutch 48 is engaged with the ground 56. More particularly, the brake 52 may include a brake caliper 60 that selectively engages the brake friction plate 58.

In FIG. 9, the multi-plate wet clutch assembly 50 of the two-speed transmission 20 provides a neutral state in response to the clutch 54 permitting free rotation of the clutch friction plate 62 and the brake 52 permitting free rotation of the brake friction plate 58. In the neutral state, input shaft 24 and the sun gear 36 rotate and drive rotation of the first gear 44 of the at least one double step pinion 38. Rotation of the at least one double step pinion 38 and thus the second gear 46 drives rotation of the ring gear 40. The ring gear 40 rotates freely in the neutral state because the dog clutch 48 and the brake 52 are not engaged. Thus, all of the torque supplied to the input shaft 24 goes to rotating the ring gear 40 so the carrier 42 is not rotationally driven. The carrier 42 is connected to the output shaft 26 so the output shaft 26 is not rotationally driven in the neutral state.

The first gear ratio is provided in response to the clutch 54 permitting free rotation of the clutch friction plate 62 and the brake 52 selectively engaging the brake friction plate 58 when the dog clutch 48 is engaged. The brake 52 and the dog clutch 48 lock the ring gear 40 in place so that the ring gear 40 remains stationary with respect to the ground 56. As the input shaft 24 and the sun gear 36 rotate and drive the first gear 44 of the at least one double step pinion 38, the at least one double step pinion 38 orbits within the ring gear 40, traveling in a circular arc, as the second gear 46 of the at least one double step pinion 38 runs along the ring gear 40. This orbital movement of the at least one double step pinion 38 with respect to the ring gear 40 drives rotation of the carrier 42 and thus the output shaft 26 at a rotational speed that is different than a rotational speed of the input shaft 24.

The second gear ratio is provided in response to the clutch 54 selectively engaging the clutch friction plate 62 and the brake 52 permitting free rotation of the brake friction plate 58. The clutch 54 locks rotation of the carrier 42 with the input shaft 24. Therefore, the carrier 42 and thus the output shaft 26 rotate at the same rotational speed as the input shaft 24. Accordingly, the second gear ratio may be a 1:1 ratio.

The foregoing description of the embodiments has been provided for the purposes of illustration and description. It is not intended to be exhaustive or limiting. Obviously, many modifications and variations of the present disclosure are possible in light of the above teachings and may be practiced otherwise than as specifically described while within the scope of the appended claims.

What is claimed is:

1. A transmission configured to transfer torque from a motor to a final drive unit, the transmission comprising:
    an input shaft having a first end configured to connect with the motor and a second end opposite the first end;
    an output shaft configured to connect with the final drive unit;
    a planetary gear set selectively coupling the input shaft and the output shaft and including a first ring gear and a second ring gear;
    a first mechanical diode connected to the first ring gear and providing selective engagement of the first ring gear;
    a second mechanical diode connected to the second ring gear and providing selective engagement of the second ring gear; and
    a multi-plate wet clutch assembly including a first brake connected to a ground and the first mechanical diode and a second brake connected to the ground and the second mechanical diode,
    the multi-plate wet clutch assembly providing a first gear ratio in response to engagement of the second brake and the second mechanical diode such that the second brake resists rotation of the second ring gear with respect to the ground,
    the multi-plate wet clutch assembly providing a second gear ratio in response to engagement of the first brake and the first mechanical diode such that the first brake resists rotation of the first ring gear with respect to the ground.

2. The transmission of claim 1, wherein the multi-plate wet clutch assembly provides neutral in response to the first brake permitting free rotation of the first ring gear and the second brake permitting free rotation of the second ring gear.

3. The transmission of claim 1, wherein the first brake includes a first brake friction plate connected to the first mechanical diode and the second brake includes a second brake friction plate connected to the second mechanical diode.

4. The transmission of claim 3, wherein (i) when the first gear ratio is selected, the second mechanical diode is engaged and the second brake engages the second brake friction plate and (ii) when the second gear ratio is selected, the first mechanical diode is engaged and the first brake engages the first brake friction plate.

5. The transmission of claim 1, wherein the planetary gear set includes at least one sun gear connected to the input shaft, a first planet gear, and a second planet gear.

6. The transmission of claim 5, wherein the first planet gear has a first outer diameter and the second planet gear has a second outer diameter that is less than the first outer diameter, the first planet gear of the planetary gear set being disposed in meshing engagement with the at least one sun gear and being disposed radially outwardly of the at least one sun gear.

7. The transmission of claim 6, wherein the first ring gear is disposed in meshing engagement with the first planet gear of the planetary gear set, the first ring gear circumscribing the first planet gear of the planetary gear set.

8. The transmission of claim 7, wherein the second ring gear is disposed in meshing engagement with the second planet gear of the planetary gear set, the second ring gear circumscribing the second planet gear of the planetary gear set.

9. The transmission of claim 5, wherein the planetary gear set includes a carrier connected to the output shaft and supporting the first and second planet gears.

10. The transmission of claim 5, wherein the first planet gear and the second planet gear of the planetary gear set are defined by a double step pinion and rotate together as part of the double step pinion.

11. A transmission comprising:
an input shaft having a first end configured to connect with an electric motor and a second end opposite the first end;
an output shaft;
a planetary gear set selectively coupling the input shaft and the output shaft and including a first ring gear and a second ring gear;
a first mechanical diode connected to the first ring gear and providing selective engagement of the first ring gear;
a second mechanical diode connected to the second ring gear and providing selective engagement of the second ring gear; and
a clutch assembly including a first brake connected to a ground and the first mechanical diode and a second brake connected to the ground and the second mechanical diode,
the clutch assembly providing a first gear ratio in response to engagement of the second brake and the second mechanical diode such that the second brake resists rotation of the second ring gear with respect to the ground,
the clutch assembly providing a second gear ratio in response to engagement of the first brake and the first mechanical diode such that the first brake resists rotation of the first ring gear with respect to the ground,
the clutch assembly providing neutral in response to the first brake permitting free rotation of the first ring gear and the second brake permitting free rotation of the second ring gear.

12. The transmission of claim 11, wherein the clutch assembly is a multi-plate wet clutch assembly.

13. The transmission of claim 11, wherein the first brake includes a first brake friction plate connected to the first mechanical diode and the second brake includes a second brake friction plate connected to the second mechanical diode.

14. The transmission of claim 13, wherein (i) when the first gear ratio is selected, the second mechanical diode is engaged and the second brake engages the second brake friction plate and (ii) when the second gear ratio is selected, the first mechanical diode is engaged and the first brake engages the first brake friction plate.

15. The transmission of claim 11, wherein the planetary gear set includes at least one sun gear connected to the input shaft, a first planet gear, and a second planet gear.

16. The transmission of claim 15, wherein the first planet gear has a first outer diameter and the second planet gear has a second outer diameter that is less than the first outer diameter, the first planet gear of the planetary gear set being disposed in meshing engagement with the at least one sun gear and being disposed radially outwardly of the at least one sun gear.

17. The transmission of claim 16, wherein the first ring gear is disposed in meshing engagement with the first planet gear of the planetary gear set, the first ring gear circumscribing the first planet gear of the planetary gear set.

18. The transmission of claim 17, wherein the second ring gear is disposed in meshing engagement with the second planet gear of the planetary gear set, the second ring gear circumscribing the second planet gear of the planetary gear set.

19. The transmission of claim 15, wherein the planetary gear set includes a carrier connected to the output shaft and supporting the first and second planet gears.

20. The transmission of claim 15, wherein the first planet gear and the second planet gear of the planetary gear set are defined by a double step pinion and rotate together as part of the double step pinion.

* * * * *